United States Patent [19]

Miller et al.

[11] Patent Number: 5,024,300

[45] Date of Patent: Jun. 18, 1991

[54] DISC BRAKE ROTOR AND WHEEL ASSEMBLY

[75] Inventors: Jon E. Miller, Spring Valley; Donald E. Schenk, Vandalia, both of Ohio

[73] Assignee: General Motors Corporation, Detroit, Mich.

[21] Appl. No.: 353,412

[22] Filed: May 17, 1989

[51] Int. Cl.$^5$ ............................................. F16D 65/853
[52] U.S. Cl. ............................. 188/264 CC; 188/71.6; 192/70.12; 192/113 R
[58] Field of Search .................. 188/264 CC, 71.6; 192/70.12, 113 R

[56] References Cited

U.S. PATENT DOCUMENTS

| | | | |
|---|---|---|---|
| 3,013,636 | 12/1961 | Dotto et al. | 188/264 CC |
| 3,651,895 | 3/1972 | Whitfield | 188/71.6 |
| 4,130,187 | 12/1978 | Midolo | 188/264 CC |
| 4,509,619 | 4/1985 | Baynes et al. | 188/73.38 X |

FOREIGN PATENT DOCUMENTS

| | | | |
|---|---|---|---|
| 2950057 | 6/1981 | Fed. Rep. of Germany | 188/71.6 |
| 3736508 | 1/1989 | Fed. Rep. of Germany | 188/71.6 |
| 157841 | 9/1982 | Japan | 188/264 CC |
| 1413520 | 11/1975 | United Kingdom | 188/264 CC |

Primary Examiner—George E. A. Halvosa
Attorney, Agent, or Firm—Ernest E. Helms

[57] ABSTRACT

A vehicle wheel and rotor assembly is provided for use with a vehicle having a disc-type brake. The assembly includes a wheel for threaded connection with an axle and a rotor. The rotor has a core section joined to an annular ring section and the core section has apertures aligned for threadably joining the rotor to the wheel. Heat pipes are embedded within said rotor core. The heat pipes provide a heat sink for the annular ring section of the rotor causing a fluid within the heat pipe to vaporize on an end of the heat pipes more adjacent to the annular ring section and to condense on an end of the heat pipe more adjacent to the wheel to transfer heat from the annular ring to the wheel.

2 Claims, 2 Drawing Sheets

DISC BRAKE ROTOR AND WHEEL ASSEMBLY

FIELD OF THE INVENTION

The field of the present invention is that of a wheel and rotor assemblies for automotive vehicles with disc-type vehicle wheel brakes.

DISCLOSURE STATEMENT

It is known in the art to provide disc-type brakes for automotive vehicles. In the disc-type brake there is provided a fluid-activated caliper which has a piston with an attached pads. When the piston is activated, it makes contact with a rotor which is boltably connected to the vehicle wheel. A more detailed description of vehicle disc type brakes can be found from a reading of U.S. Pat. Nos. 4,603,760; 4,596,317; 4,509,619; 4,487,297; 4,475,634; 4,470,485; and 4,433,757, commonly assigned and the disclosures thereof are incorporated by reference herein.

SUMMARY OF THE INVENTION

It is an object of the present invention to provide a wheel rotor assembly and method of utilization of the same wherein heat build up in the rotor can be reduced by transferring heat form the rotor to the vehicle wheel to allow dissipation of the heat thereof by the vehicle wheel in the atmosphere.

Other objects and advantages of the present invention can become more apparent to those skilled in the art as the nature of the invention is better understood from the accompanying drawings and a detailed description.

DETAILED DESCRIPTION OF THE DRAWINGS

Figure 1:
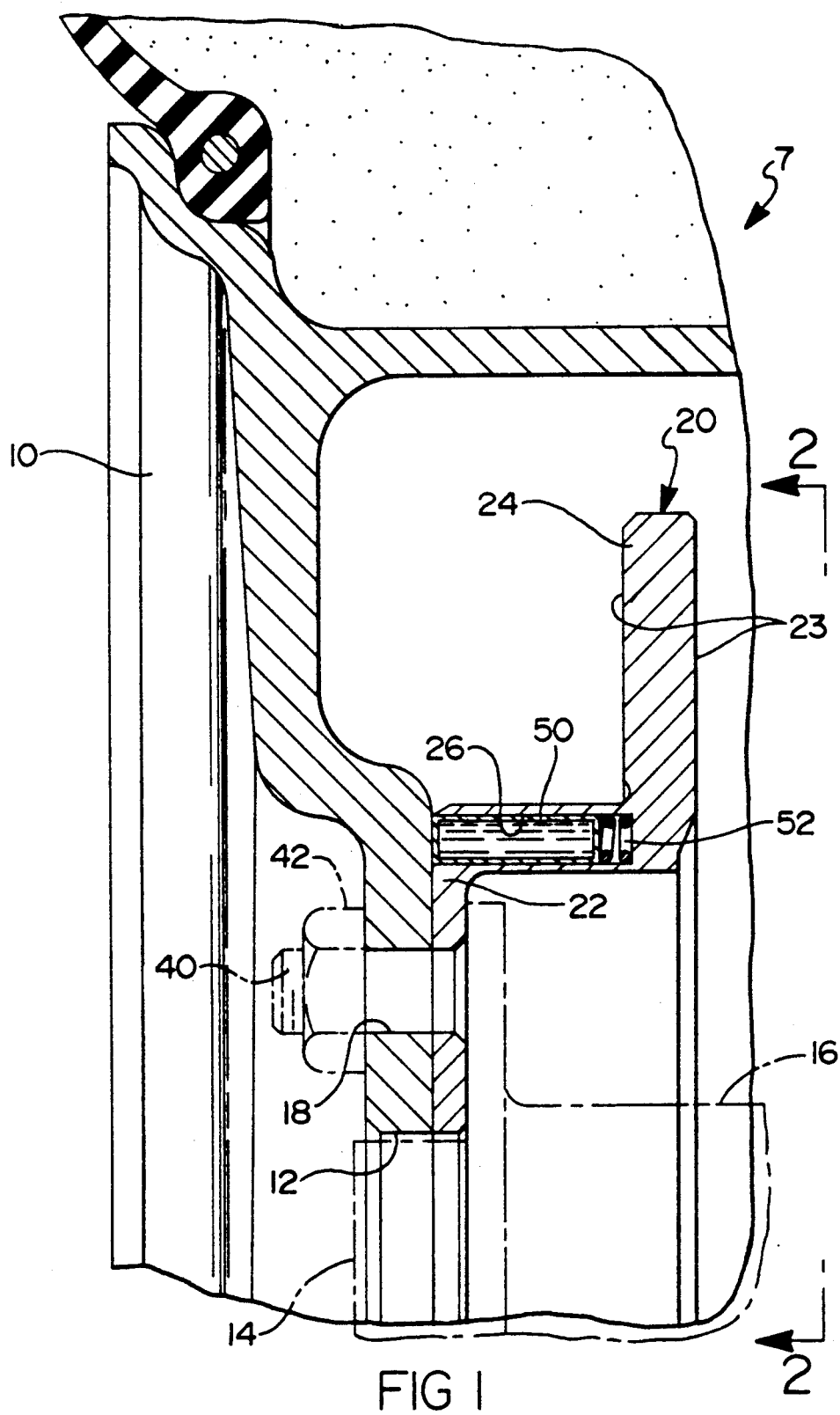
FIG. 1 is a sectional cut away view of a preferred embodiment assembly according to the present invention.
Figure 2:
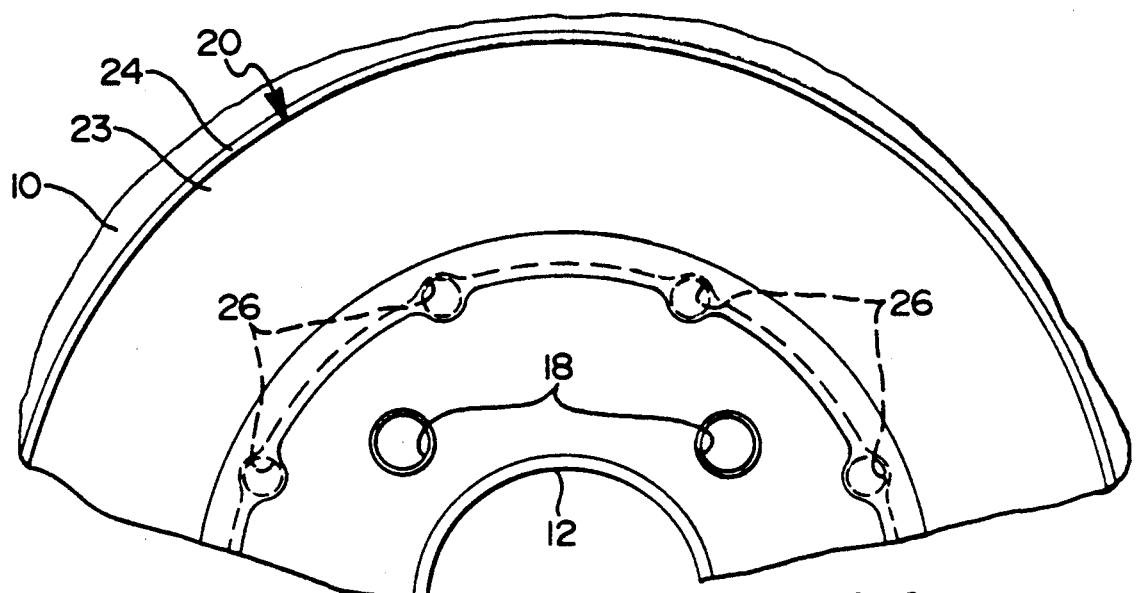
FIG. 2 is a cut away view taken along line 2—2 of FIG. 1.

Referring to FIG. 1, a vehicle wheel 10 and rotor 20 assembly 7 according to the present invention is provided. The assembly is used with a conventional disc-type brake and has a caliper similar to that as described in the afore-mentioned patents whose exact details are unnecessary for further explanation in regards to this invention. The said caliper has a fluid activated piston and brake pads which makes frictional engagement with the rotors annular generally flat surfaces 23.

The wheel 10 of the present invention has an inner aperture 12 for insertion of the cap 14 of the vehicle wheel axle 16 and also has a plurality of apertures 18 allowing threaded joining of the wheel 10 with the wheel axle 16 of the vehicle by virtue of a plurality of threaded studs 40 and nuts 42. Joined with the wheel 10 via a core section 22 by said studs is the rotor 20. Joined to the rotor core section 22 is the annular ring section 24. As mentioned previously, the annular ring section 24 provides a generally flat surfaces 23 for frictional engagement with the brake pads of the caliper to restrain motion of the wheel 10. Within geometrically spaced bores 26 of the rotor in its core section (generally parallel to the axle 16) is inserted a heat pipe. The heat pipe is exterior preferably made of a copperous material and often utilizes an alcoholic or water mixture as a fluid. As shown, the heat pipe 50 is biased into engagement with the wheel 10 (typically aluminum) by a spring 52 and a thermal grease or gel surrounds the heat pipe to facilitate heat transfer from the rotor 20 to the heat pipe 50.

In operation, the heat pipe end more closely adjacent to the rotor ring section 24 acts as a heat sink causing the fluid within the heat pipe to vaporize. The fluid then flows towards the heat pipe cooler end which is in contact with the wheel 10 and condenses transferring heat to the wheel 10. The wheel then dissipates the heat into the atmosphere.

Figure 3:
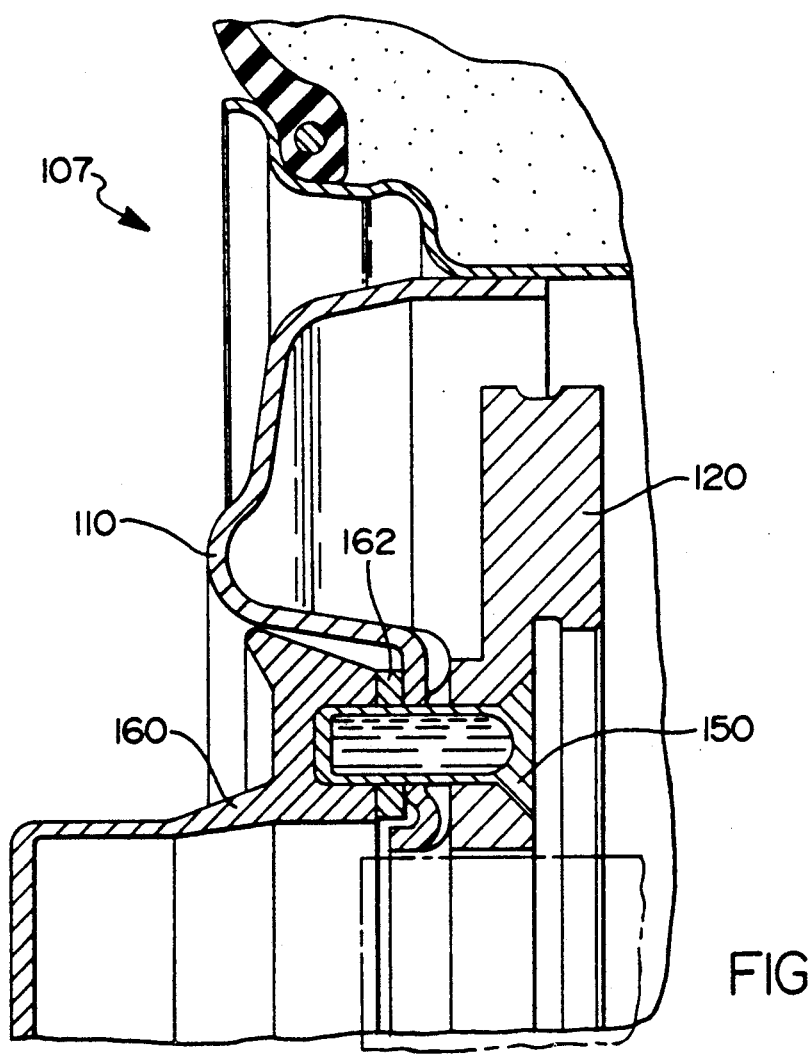
FIG. 3 is a sectional view of an alternate preferred embodiment of the present invention.

Referring to FIG. 3, the heat pipe 150 is inserted or press fitted into an aperture which projects through the rotor 120 and typically the heat pipe will be press fitted therein. The other end of the heat pipe fits within a stub 160 that is connected with the wheel 110. The stub 160 provides a heat transfer medium which is especially useful when utilizing the inventive assembly 107 with the pressed steel type automotive vehicle wheels rather than the aluminum type wheel which is shown in FIG. 1. The stub 160 via contact plate 162 helps to transfer heat to the wheel 110. The above is helpful since the heat pipe 150 does not have a large surface area in contact with the wheel 110.

While a few of the embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A vehicle wheel and rotor assembly for use with an automotive vehicle having an axle and an automotive disc-type brake having a fluid pressurized caliper with brake pads, said assembly in combination comprising;
   a wheel for threaded connection with said axle via a plurality of studs;
   a rotor having an annular ring section generally providing a flat surface for a friction surface for engagement with said caliper brake pads to restrain rotation of said wheel, said rotor having a core section joined to said annular ring section and said core section having apertures aligned for threadably joining said rotor to said wheel;
   heat pipe means embedded within said rotor core, said heat pipe means providing a heat sink for said annular ring section of said rotor causing a fluid within said heat pipe means to vaporize on an end of said heat pipe means more adjacent to said annular ring section and to condense on an end of said heat pipe means more adjacent to said wheel to transfer heat from said annular ring section to said wheel for dispersement from said wheel by convection into the atmosphere;
   and spring means for biasing said heat pipe means into contact with said wheel.

2. A method of cooling a vehicle wheel in a rotor assembly utilized in a disc-type brake having a fluid activated caliper with brake pads, said method in combination comprising;
   connecting to said axle of said vehicle via a plurality of threaded studs a vehicle wheel;

threadably joining to said wheel a rotor by a core section of said rotor having apertures aligned to be threadably joined with said wheel and an annular ring section generally having flat surfaces providing a frictional surface for engagement with said caliper brake pads to restrain rotation of said wheel and joining to said core section; and embedding within said rotor core heat pipe means providing a heat sink for said annular ring section of said rotor causing a fluid within said heat pipe means to vaporize on one end of said heat pipe more adjacent to said annular ring section and to condense on an end of said heat pipe means more adjacent to said wheel to transfer heat from said rotor section to said wheel for dissipation in said wheel by convention in the atmosphere; and spring biasing said heat pipe means toward said wheel.

* * * * *